(12) United States Patent
Ray et al.

(10) Patent No.: US 10,744,456 B2
(45) Date of Patent: Aug. 18, 2020

(54) WET ELECTROSTATIC GAS CLEANING SYSTEM WITH NON-THERMAL PLASMA FOR NOX REDUCTION IN EXHAUST

(71) Applicant: Enviroenergy Solutions, Inc., Hallandale Beach, FL (US)

(72) Inventors: Isaac Ray, Brooklyn, NY (US); Boris Altschuler, North Miami, FL (US)

(73) Assignee: Enviroenergy Solutions, Inc., Brooklyn, NY (US)

( * ) Notice: Subject to any disclaimer, the term of this patent is extended or adjusted under 35 U.S.C. 154(b) by 338 days.

(21) Appl. No.: 15/867,965

(22) Filed: Jan. 11, 2018

(65) Prior Publication Data

US 2018/0200670 A1  Jul. 19, 2018

Related U.S. Application Data

(60) Provisional application No. 62/446,146, filed on Jan. 13, 2017.

(51) Int. Cl.
| | |
|---|---|
| *B01D 53/32* | (2006.01) |
| *B03C 3/16* | (2006.01) |
| *B01D 53/50* | (2006.01) |
| *B01D 53/56* | (2006.01) |
| *B01D 53/78* | (2006.01) |
| *C01B 13/11* | (2006.01) |
| *B03C 3/06* | (2006.01) |
| *B03C 3/017* | (2006.01) |
| *B03C 3/41* | (2006.01) |

(Continued)

(52) U.S. Cl.
CPC .......... *B01D 53/323* (2013.01); *B01D 53/50* (2013.01); *B01D 53/56* (2013.01); *B01D 53/78* (2013.01); *B03C 3/017* (2013.01); *B03C 3/025* (2013.01); *B03C 3/06* (2013.01); *B03C 3/16* (2013.01); *B03C 3/41* (2013.01); *B03C 3/49* (2013.01); *C01B 13/115* (2013.01); *F23J 15/02* (2013.01); *B01D 2251/104* (2013.01); *B01D 2258/0283* (2013.01); *B01D 2259/818* (2013.01); *B03C 2201/10* (2013.01); *C01B 2201/10* (2013.01); *C01B 2201/22* (2013.01); *F23J 2215/10* (2013.01)

(58) Field of Classification Search
USPC ...................................................... 422/186.04
See application file for complete search history.

(56) References Cited

U.S. PATENT DOCUMENTS

| | | | | |
|---|---|---|---|---|
| 2,024,226 A | * | 12/1935 | Irwin ..................... | B01D 47/06 96/53 |
| 3,315,445 A | * | 4/1967 | De Seversky ......... | B01D 47/06 96/53 |

(Continued)

FOREIGN PATENT DOCUMENTS

| | | | | |
|---|---|---|---|---|
| WO | WO-9219380 A1 | * | 11/1992 | ............... B03C 3/06 |

OTHER PUBLICATIONS

Kirk-Othmer; Encyclopedia of Chemical Technology; 5th Edition; 2006; vol. 1, pp. 796-797; vol. 10, pp. 96-102; vol. 11, pp. 718-721; vol. 13, p. 180; vol. 17, pp. 180-184; vol. 26, p. 692.

*Primary Examiner* — Christopher P Jones
*Assistant Examiner* — Sonji Turner
(74) *Attorney, Agent, or Firm* — Irving M. Fishman

(57) ABSTRACT

An apparatus and method of generating ozone and its incorporation into a system apparatus and method of cleaning exhaust gasses from fossil fuel burning boilers and/or furnaces are disclosed.

13 Claims, 6 Drawing Sheets

(51) Int. Cl.
*B03C 3/02* (2006.01)
*B03C 3/49* (2006.01)
*F23J 15/02* (2006.01)

(56) References Cited

U.S. PATENT DOCUMENTS

| | | | |
|---|---|---|---|
| 5,254,155 A * | 10/1993 | Mensi | B03C 3/16 96/100 |
| 5,316,737 A | 5/1994 | Skelley et al. | |
| 5,547,496 A * | 8/1996 | Hara | B03C 3/025 96/79 |
| 6,110,256 A * | 8/2000 | Reynolds | B03C 3/019 95/4 |
| 6,193,782 B1 * | 2/2001 | Ray | B03C 3/16 55/DIG. 38 |
| 6,294,003 B1 * | 9/2001 | Ray | B03C 3/16 55/DIG. 38 |
| 6,365,112 B1 | 4/2002 | Babko-Malyi | |
| 6,506,351 B1 | 1/2003 | Jain et al. | |
| 6,508,861 B1 | 1/2003 | Ray | |
| 7,052,662 B2 | 5/2006 | Duncan et al. | |
| 7,214,356 B2 | 5/2007 | Hsieh et al. | |
| 7,297,182 B2 | 11/2007 | Ray et al. | |
| 7,303,735 B2 | 12/2007 | Suchak et al. | |
| 7,316,735 B2 * | 1/2008 | Tomimatsu | B03C 3/41 55/DIG. 38 |
| 7,318,857 B2 | 1/2008 | Ray et al. | |
| 7,459,009 B2 | 12/2008 | Ray et al. | |
| 7,514,053 B2 | 4/2009 | Johnson et al. | |
| 7,534,400 B2 | 5/2009 | Hsieh et al. | |
| 7,767,005 B2 * | 8/2010 | Gale | B03C 3/15 96/97 |
| 7,767,150 B1 | 8/2010 | Zaromb et al. | |
| 8,574,521 B2 | 11/2013 | Suchak et al. | |
| 8,771,600 B2 | 7/2014 | Ray | |
| 8,790,444 B2 * | 7/2014 | Ellis | B01D 53/1456 95/65 |
| 8,888,900 B2 * | 11/2014 | Seeley | B01D 47/14 96/290 |
| 9,533,311 B2 * | 1/2017 | Ray | B03C 3/15 96/97 |
| 2011/0229376 A1 * | 9/2011 | Ray | B03O 3/025 422/120 |
| 2013/0064730 A1 * | 3/2013 | Nakayama | B01D 53/323 422/187 |
| 2017/0018410 A1 * | 1/2017 | Laux | B01D 53/323 422/187 |

* cited by examiner

WET ELECTROSTATIC GAS CLEANING SYSTEM WITH NON-THERMAL PLASMA FOR NOX REDUCTION IN EXHAUST

This application claims priority of U.S. Provisional application Ser. No. 62/446,146, filed Jan. 13, 2017.

FIELD OF THE INVENTION

This invention is in the field of cleaning exhaust gases, specifically exhaust from boilers and furnaces using any type of fossil fuel. In some embodiments, the invention relates more specifically to ozone oxidation of various components of exhaust gases. In some embodiments, the invention relates to the removal of particulate matter from exhaust streams down to about 0.01 microns in particle size. The invention also relates to improved ozone and free radical generation devices, especially for use in the invention systems.

BACKGROUND OF THE INVENTION

The invention relates to the improvements in the field of air pollution control, specifically for removal of ash particulate matter (PM), nitrogen oxides ($NO_x$), sulfur dioxide (SO2), hydrogen chloride (HCl), hydrocarbons (HC), carbon monoxide (CO) and other toxic air pollutants (such as, for example, Mercury) from the exhaust of fossil fuel burning boilers and furnaces. Particles emitted from fossil fuel boilers and furnaces range from very large (such as hundreds of microns) to very small (in most cases smaller than 1 micron, comparable in size with bacteria and 100 times smaller than human hair).

Also, depending on the type of the fuel and type of boiler or furnace being used, the exhaust gases will contain, most, if not all, of the following gas pollutants: Sulfur oxides ($SO_x$) (mixed oxides of sulfur), Nitrogen oxides ($NO_x$) (mixed oxides of nitrogen), Carbon Monoxide (CO) and others.

The field of cleaning gas pollutants from exhaust gases has been substantially urged forward with the passage of various Environmental Protection initiatives since the 1970s. One method that has evolved over the last 40 years includes selective catalytic nitrogen oxides reduction, which relies on catalytic reactions to reduce the nitrogen oxides to $N_2$ gas and suffers from being expensive and subject to catalyst poisoning (which renders the catalyst ineffective). Similar processes have been constructed to deal with sulfur oxides. Another method is the selective non-catalytic reduction method, which relies on chemical reactions to reduce the nitrogen oxides to $N_2$ gas. The non-catalytic methods require quite high temperatures and large volumes of reactor spaces to obtain the reductions desired. These demands, among others, make the non-catalytic chemical methods undesirable in many instances and simply not possible in other contexts.

One issue with the reduction methods above is that there are often incomplete reductions leaving some of the mixed oxides in the effluent gas. To deal with such leftover oxides, the art has coupled the above with aqueous scrubbers in which the gas containing the various mixed oxides is contacted with water. While higher oxides are reasonably soluble in water (forming acids), the lower oxide of nitrogen, nitrogen oxide (NO), and others have a very limited solubility in water, making the water scrubbing of gas exhaust (either before or after the reduction processes above) of limited value, especially as the environmental regulatory environment gets stricter.

Another process that has been developed in the art is to oxidize the gas flow so as to oxidize the mixed nitrogen oxides ($NO_x$) and the mixed sulfur oxides ($SO_x$) to the higher, more soluble oxides, which can then be subjected to a water scrubbing and thereby reduce the gas effluent content of these contaminants.

A persistent problem with all of the above processes however is dealing with ash that is in the sub-micron particle size, and which may still be contained in the effluent gas that is otherwise released to the environment. Environmental regulations of Mar. 16, 2012 place greater emphasis on the abatement of PM 2.5 particulates (all particles that are smaller than 2.5 microns) as well as on removal of mercury. While various designs of wet scrubber systems are suitable for collection of larger particulate sizes, high efficiency removal of sub-micron particles in typical wet scrubbers in the art rely on extraordinary amounts of energy being applied to the gas stream, resulting in prohibitive operating costs.

One process involving oxidation is to contact the gas stream with ozone. However, traditional ozone generators require either purified oxygen gas or "clean air" as inputs for the ozone generation, each of which is a substantial and costly disincentive to using those methods. In addition, the internal tubes in which the ozone is generated are made of glass, such that the ozone generator itself as a unit is fragile and subject to breakage in use, requiring still further costs in operation of the process. Oxidizing gas stream purification apparatus and methods known in the art include the following, non-limiting list of patents: U.S. Pat. Nos. 8,574,521; 7,514,053 (using non-ozone, non-free radical, chemical oxidation); and U.S. Pat. Nos. 7,303,735, 7,214,356, 7,052,662 and 9,533,311 (each using a separate ozone generator which then injects the ozone into the gas stream); among others. Each of these US patents is incorporated herein in their entirety by reference except to the extent that they contradict or detract from the statements made in the present application, in which case, the statements in the present application will control.

OBJECTS OF THE INVENTION

One object of the invention is to provide an improved method of wet scrubbing an effluent gas to remove environmentally unsuitable contaminants therefrom.

Another object of the invention is to provide an improved method of wet scrubbing an effluent gas to remove a substantial portion of sub-micron particulate matter from the gas effluent.

Yet another object of the invention is to provide an improved method of wet scrubbing an effluent gas so as to remove particulate matter down to a particle size of about 0.01 microns (10 nanometers).

Still another object of the invention is to provide a system for obtaining the foregoing objects.

An even further object of the invention is to provide an improved wet electrostatic scrubber precipitator unit (WESP1) having specific parameters for high efficiency ozone generation for oxidation of lower oxides of nitrogen and sulfur to higher oxides thereof.

Yet another object of the invention is to provide an improved ozone generator capable of using an ordinary non-clean, non-purified air or the same dirty process gas as the oxygen source for the ozone generator.

An even further object of the invention is to provide an improved ozone generator that can operate using a gas stream which is to be cleaned via ozonation, which gas stream contains oxygen, as the source of oxygen for use in generating ozone.

Still other objects of the invention will be apparent to those of ordinary skill in the art after having benefit of the present disclosure.

SUMMARY OF THE DESCRIPTION

The foregoing objects are surprisingly achieved by the presently described invention method, system incorporating the invention ozone generator. The invention method is generally described as operating the invention system in order to obtain the invention desired results. The invention system includes two wet electrostatic precipitator (WESP) units. The first WESP unit (WESP1) includes an ionization/(ozone) oxidation chamber. The WESP1 unit results in first electrostatically charging components of the gas effluent from another source that is the feed gas for the invention process. The electrostatic charging operates as an initial ozone and plasma generator with some oxidation of the gas components taking place essentially simultaneously. Mercury, which may be present in the gas stream, upon contact with the ozone, reacts with the ozone and deposits on walls of the ozone generator and other walls thereafter and can be washed therefrom into the collecting tank for proper disposal. Also taking place within the WESP1 unit is some particulate collection and droplet collection. Further additional oxidation of insoluble oxides to soluble ones (particularly NO to $NO_2$, $N_2O_5$, and other oxides) takes place in a duct connecting the WESP1 unit and the WESP2 unit. Scrubbing of the higher oxides ($NO_2$ and other nitrogen oxides and still remaining sulfur oxides) with aqueous (preferably basic, more preferably Caustic) solution takes place in a packed bed located in the bottom (as seen in the orientation in FIG. 1) of the WESP2 unit, the packing also providing improved gas distribution across the face area. Final polishing cleaning of the gas stream with removal of all solid particles and liquid droplets down to 0.01 micron (10 nanometer) in size takes place in the WESP2 unit located above the packing of the scrubber associated with the WESP2 unit.

DETAILED DESCRIPTION OF THE EMBODIMENTS OF THE INVENTION

Figure 1:
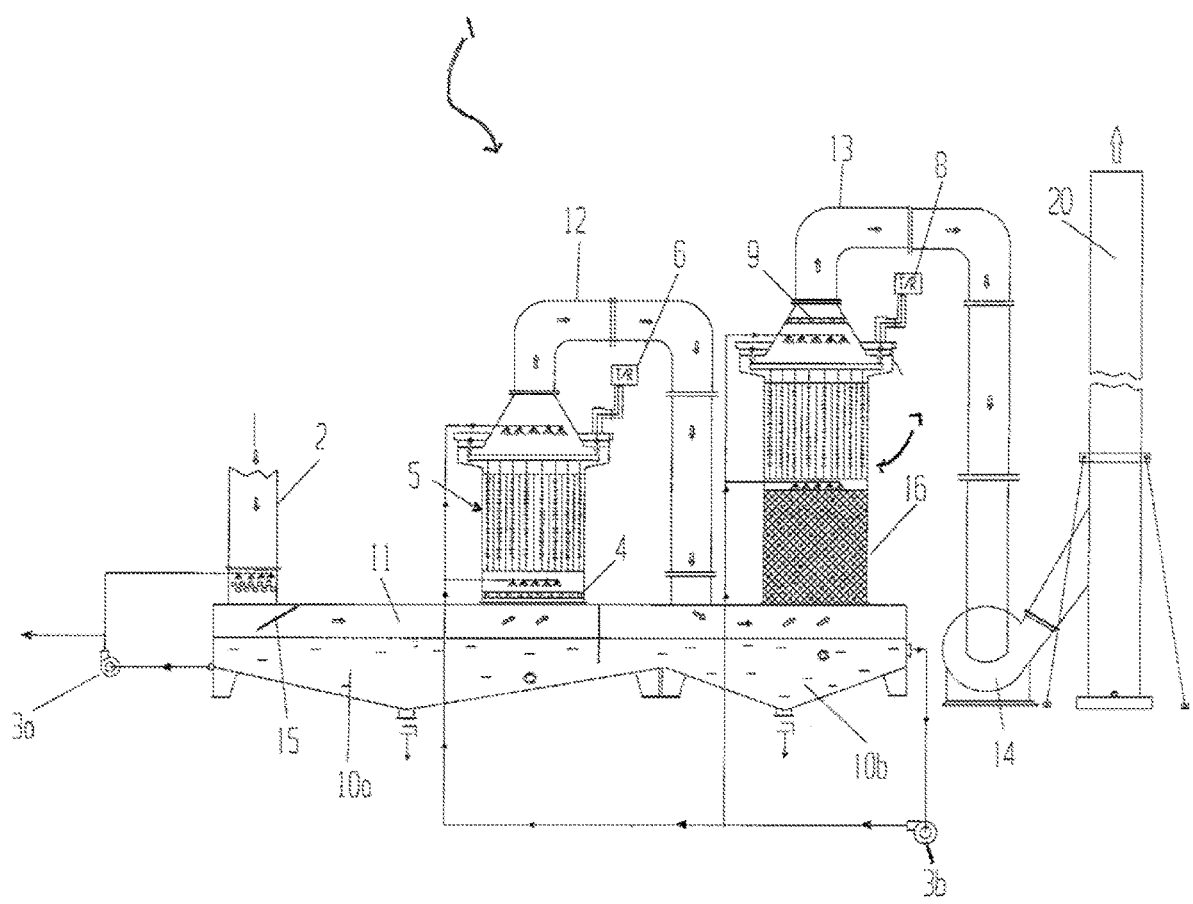
FIG. 1 is a process flow overview of one typical, non-exclusive embodiment of the invention.

The invention will be described in detail with respect to the embodiments shown in the accompanying drawings, however, the invention is not limited to the drawing embodiments, the invention being limited only by the claims and the overall disclosure.

As seen in FIG. 1, inlet gas from a boiler or furnace (which may or may not be first processed through a cyclonic separator (not shown) or other known means of removing particulate matter of greater than 5 microns (hereinafter large particulate matter), and optionally cooled with or without recovery of the heat as may be done in known economizers (not shown)) is directed first to a proprietary Quencher/Adjustable Rod-Deck Scrubber (ARDS) (1) which removes substantial amounts of HCl and $SO_2$ and particulate matter of 2 microns in size and larger (i.e., medium particulate matter and any remaining large particulate matter; medium sized particulate matter being between about 2 microns and 5 microns in size); and, with the use of a liquid spray that is turbulently mixed with the gas, the liquid enlarges some of the smaller (particulate matter of less than about 2 microns in size) ash particles allowing the smaller particulate matter (as enlarged to approximately 2 microns and larger) to also be removed. The wet gas then moves from the ARDS (2) unit into a connecting region to the first WESP unit (WESP1) (5) through a series of baffles (15). The baffles (15) help to separate the large particulate matter that escaped the ARDS (2) and some of the larger liquid droplets and liquid coated particulates matter still in the gas stream. Some of the soluble nitrogen oxides and soluble sulfur oxides that were present are also dissolved in the liquid. Separated water can be, and preferably is, recycled back to the ARDS (2) typically using optional recycle pump (3a). The gas (still having particulates smaller than 2 microns therein) then continues into the bottom (as seen in the orientation in FIG. 1) of the first WESP unit (WESP1) (5). The gas passes through the WESP1 (5) unit gaining charge and being contacted with ozone (and potential other free radicals generated concurrently with the ozone or the result of downstream sequella of the ozone and free radicals interacting with each other and/or gas stream components), which oxidizes the components, especially the various nitrogen oxides and sulfur oxides (among other contaminants) to more soluble higher oxides. The ozone oxidation continues as the gas flow exits the WESP1 (5) unit and enters the connecting duct (11) to the second WESP (WESP2) (7) unit. The WESP2 (7) unit contains aqueous scrubber packs for the higher oxides (such as $NO_2$, $N_2O_5$, $SO_2$, and $SO_3$, among others). On leaving the WESP2 (7) unit, the gas flow is ready to be discharged, having had particles down to 0.01 microns removed therefrom with excellent efficiency as well as removing substantially all of the nitrogen and sulfur oxides, along with other air pollution contaminants.

More specifically with reference to Fig, 1, the overall system (1) comprises a Quencher/Adjustable Rod-Deck Scrubber (ARDS) (2), optional recycling pump (3a) and optional recycling, pump (3b), a first pass mist eliminator (4), a first pass Wet Electrostatic Precipitator Unit (WESP1) (5), a high voltage power supply (6) for the WESP1 (5) unit, a second pass Wet Electrostatic Precipitator Unit (WESP2) (7), a power supply (8) for the WESP2 (7) unit, a post-WESP2 mist eliminator (9), collecting tanks (10a) and (10b), first duct (11) between ARDS (2) and first pass mist eliminator (4) at the inlet of WESP1 (5), second duct (12) leading from the exhaust of WESP1 (5) to the intake of WESP2 (7), third duct (13) leading front the exhaust of WESP2 (7) optionally to optional induced draft blower (14) which then directs the gas flow to be discharged to the environment optionally through a stack (20) or chimney, In FIG. 1, the invention system is shown connected to an exhaust stack (20), but depending on size and operational needs, the exhaust stack (20) can be eliminated and the stack forms no part of the invention. However, in most embodiments, the exhaust is directed to an exhaust stack (20) for release into the environment after having passed through the WESP2 (7), with or without the aid of optional induced blower (14). The collecting tanks (10a) and (10b) collect up water that is separated front the gas flow, which may or may not contain water soluble components (and some separated particulate matter) that were part of the original intake gas. This aqueous liquid can either (a) be collected and recycled by the optional recycling pumps (3a) and (3b) for use in the process where. water is utilized, or (b) if desired, can be discharged for use in other contexts or as an effluent waste material. Where suitable, the recycle pumps (3a) and/or (3b) can have alternate discharge routes to such collection points other than recycle as desired or in situations where release to containers or the environment directly is suitable, the recycle pumps (3a), (3b), or both can be eliminated. However, for best efficiency the recycle pumps (3a) and (3b) are utilized and aqueous solution from the collection tanks (10a) and (10b) is recycled for use where water is utilized in the invention process.

Figure 3:
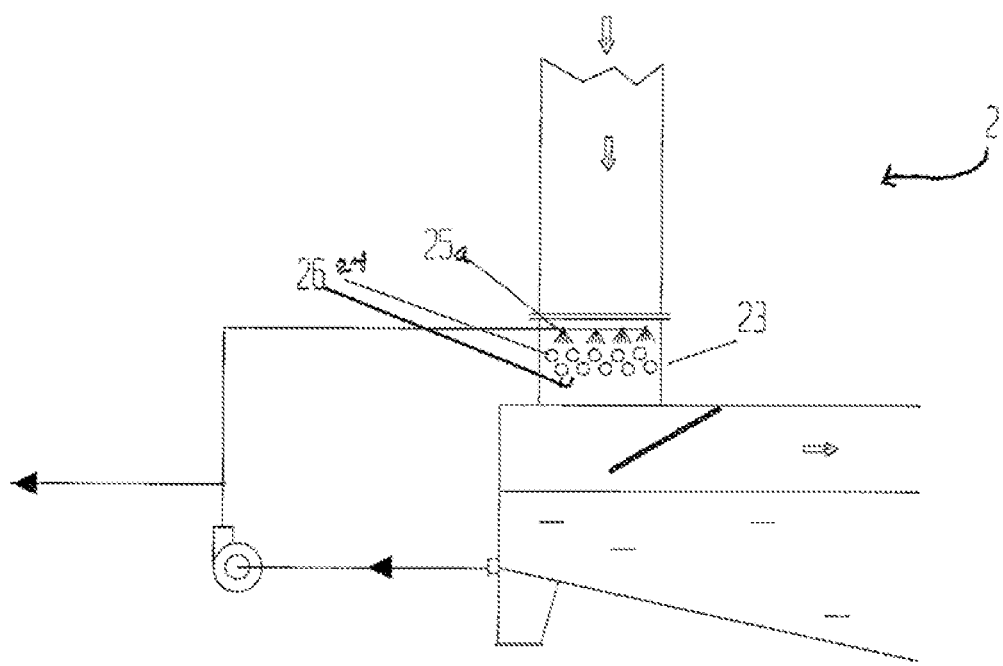
FIG. 3 is an enlarged view of the Quencher/ARDS initial segment of the invention shown in FIG. 1.
Figure 4:
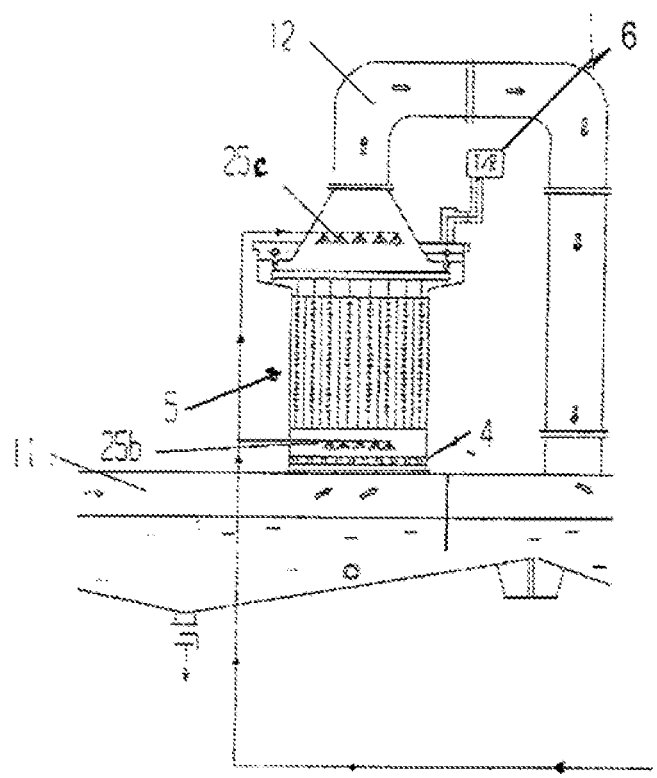
FIG. 4 is an enlarged view of the WESP1 segment of the invention shown in FIG. 1.
Figure 5:
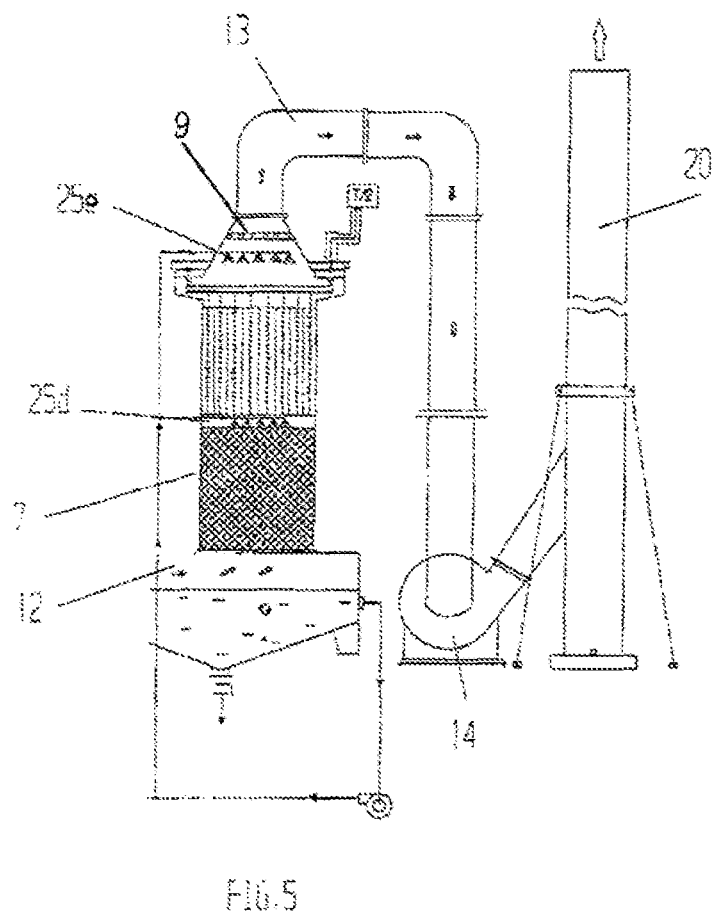
FIG. 5 is an enlarged view of the WESP2 segment of the invention shown in FIG. 1.

The Quencher/ARDS (2) unit is the first portion of the present invention elements, and is used to cool the incoming gas to a temperature so that the incoming gas is at a saturation point with respect to its contaminants, typically of about 110° F. to about 180° F. (about 43° C. to about 83° C.), preferably about 140° F. to about 158° F. (about 60° C. to about 70° C.), more preferably about 153° F. (about 67° C.-68° C.). It is a readily available piece of equipment generally known in the art. The Quencher/ARDS (2) unit also acts as a low energy venturi scrubber, scrubbing the gas of some of larger particle size particulate matter and the more soluble contaminants such as HCl and $SO_2$ present in the intake gas. The ARDS (2) (shown more clearly in FIG. 3) has a scrubber deck (23) which is made up of round tubes (24). Scrubbing liquid is sprayed via first sprayer (25a) into the gaps (26) between the round tubes (24) of the deck (23) and mixes turbulently with the gas stream producing large and small liquid droplets that collide with the solid particles of ash in the gas stream. The probability of collision between the solid particles and liquid droplets or so-called "target efficiency" mainly depends upon the ratio between the droplet and particle size (the smaller the droplet size relative to the ash particle size the better, with an optimum of 10:1 ash particle to droplet size). Thus, the smaller the droplet size, the better the ability to remove smaller particles in addition to larger ones. While the efficiency of particulate removal also depends on the uniformity of liquid distribution, liquid to gas ratio, surface tension of the liquid and solids surface properties, limiting the liquid for spraying in the ARDS (2) unit substantially narrows the variables to be addressed. Adjustments in the liquid distribution, liquid to gas ratio, and surface tension for particulate matter removal of 2 microns and larger are well known to those of ordinary skill in the gas scrubbing art. In order to create the "small droplets" the gap (26) distance between the round tubes (24) needs to be kept small (i.e. adjusted to smaller distances than in the commercially available ARDS (2) units). It should be noted that generally the smaller this distance between the round tubes (24), the greater the pressure drop across the system, thereby creating an increased energy consumption for the optional blower (14). However, due to the greater efficiency in the gas and fluid distribution and thus greater removal of the particulate matter at 2 microns and above, one can balance the efficiency of particulate removal due to the distance between the rods against the cost of the increased energy demand in operating the blower (14) in the system. These balancing points will be different for each operator and system configuration, but will be well within the skill of those in the art having benefit of this specification.

Alkali metal hydroxide, preferably sodium or potassium hydroxide, most preferably sodium hydroxide, in solution is used in the Quencher/ARDS (2) and converts HCl to NaCl and $SO_2$ to $Na_2SO_3$ via simple dissolution and salt formation. These are highly soluble and easily removed from the gas stream. As the gas stream leaves the ARDS (2), it encounters, in the duct (11), one or more baffles (15) which force the gas stream flow to contact an aqueous liquid surface in the collecting tank (10a) which removes the water droplets containing these dissolved salts and additionally removes undesired ash particles greater than about 2 microns in size from the gas stream. The duct (11) then directs the gas flow to the first pass mist eliminator (4) (located at the bottom of WESP1 (5). First pass mist eliminator (4), which also acts as a flow straightener, comprises one or more plates having multiple holes therein for the gas flow to pass therethrough and then into the ozone generation/ionization chamber (21) of WESP1 (5). Sprayer (25b) is situated between the first pass mist eliminator (4) and the ionization chamber (21) and allows for washing of the first pass mist eliminator as desired, with any liquid or particle accumulation on the first pass mist eliminator (4) dropping back into collecting tank (10a). The multiple holes in first pass mist eliminator (4) preferably comprise about 50% of the surface area of the plate, but can be varied to lesser or grater percentages as desired in a particular operation. The first pass mist eliminator (4) helps to further eliminate particles and droplets of greater than 15 microns in size that may have survived the ARDS (2) and the transit through the first duct (11) on its way toward WESP1 (5) and directs such droplets to collection tank (10a). Therefore, the ash particles in the gas stream entering the ionization chamber (21) is reduced to generally less than 2 microns and the droplet size of liquid is also of limited size. The first pass mist eliminator (4) is a conventional piece of equipment well known to those of ordinary skill in the art and obtainable from multiple sources.

At this point, the gas stream is entering the WESP1 unit (5) ionization chamber (21), which is shown in greater detail in FIGS. 2A and 2B and described in further detail below. Some of the reactions that take place in WESP1 (5) are:

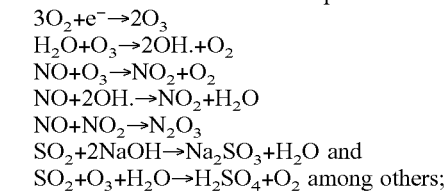

$3O_2 + e^- \rightarrow 2O_3$
$H_2O + O_3 \rightarrow 2OH\cdot + O_2$
$NO + O_3 \rightarrow NO_2 + O_2$
$NO + 2OH\cdot \rightarrow NO_2 + H_2O$
$NO + NO_2 \rightarrow N_2O_3$
$SO_2 + 2NaOH \rightarrow Na_2SO_3 + H_2O$ and
$SO_2 + O_3 + H_2O \rightarrow H_2SO_4 + O_2$ among others;

with the reactions:

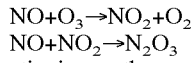

$NO + O_3 \rightarrow NO_2 + O_2$
$NO + NO_2 \rightarrow N_2O_3$ continuing as the gas stream passes into duct (12) connecting WESP1 (5) with WESP2 (7). The fact that there are a substantial amount of small liquid droplets in the WESP1 unit, a range of other radical formation also takes place which radicals increase the intensity of the oxidation process.

Unlike traditional Ozone generators that require AC current and purified Oxygen or clean air injection and are constructed from glass tubes, the invention is capable of operating using oxygen contained in the gas stream along with the contaminants and water contained therein. The invention WESP1 (5) unit ozone generation chamber (21) is constructed of solid metallic ionizing tubes (17) (particularly advantageous are solid stainless steel tubes), and runs on DC current. The electrode (18) within each tube (17) is a rigid steel electrode having serrated sharp needle points (19) providing much higher corona current than typical ionizing electrodes (which are smooth and have no such sharp points) and, as a result, a much higher generation rate of Ozone ($O_3$) (and other free radicals (O., $HO_2$., OH., and the like) at least one of which are useful for NO oxidation). As such, this WESP1 (5) unit can also be configured as a strictly non-thermal plasma generator by powering it with high frequency pulsing wave shape voltage with high rise and short duration, if deemed desirable to further boost $NO_X$ removal efficiency. Since the present invention WESP1 (5) unit does not require either purified oxygen nor clean air, there is a substantial operating cost savings relative to conventional art ozone generators.

The duct between WESP1 (5) and WESP2 (7) guides the gas stream over the liquid surface of the aqueous liquid in the collection tank (10b) where additional water soluble contaminants and droplets are removed before the gas stream is introduced into the bottom of WESP2 (7). The packing of the packed scrubber (16) located at the bottom of WESP2 (7) remains clean and free from solid particles above 1 micron since such particles have been removed by the time the gas stream enters this region. At the lower part of WESP2 (7), the gas stream comes in contact with packed scrubber (16) where alkaline materials (primarily aqueous alkali metal hydroxide, preferably sodium or potassium hydroxide, most preferably sodium hydroxide) contact the HCl, $SO_2$, $H_2SO_4$, $N_2O_3$, and $NO_2$ and any other nitrogen and/or sulfur oxides that may be present) to convert them to NaCl, $Na_2SO_3$, $Na_2SO_4$, $NaNO_2$, and $NaNO_3$, (and other higher oxides of sulfur and/or nitrogen as appropriate) or their other alkali metal salt counterparts. Some of these reactions include:

HCl+NaOH→NaCl+$H_2O$
$SO_2$+2NaOH→$Na_2SO_3$
$H_2SO_4$+2NaOH→$Na_2SO_4$+$H_2O$
$N_2O_3$+2NaOH→2$NaNO_2$+$H_2O$
2$NO_2$+2NaOH→$NaNO_2$+$NaNO_3$+$H_2O$
2$NO_2$+4$Na_2SO_3$→4$Na_2SO_4$+$N_2$.

Sprayer (25d) is used to wash the packed scrubber with water or additional aqueous alkaline solution to further aid in the dissolution and salt formation of the soluble oxides. Additional sprayer (25e) is separately used in a similar manner to wash the walls of the WESP2 unit which collect remaining particles and droplets of dissolved oxides. Finally, the gas stream passes through the post WESP2 mist eliminator (9) before exiting into duct (13). The WESP2 (7) unit operates strictly as a high efficiency wet electrostatic precipitator/mist eliminator. All particles and droplets down to about 0.01 micron (10 nanometer) are removed from the gas stream by the time the gas stream leaves the WESP2 (7) unit. Thus, the invention delivers a clean, environmentally friendly gas stream to the outside environment via duct (13), optional blower (14) and through the exit (which may or may not be through a stack (20).

Turning to the details of the WESP1 (5) unit (seen in more detail in FIG. 2A and FIG. 2B), the ionization and collection segment comprises a multiple array of tubes (17) and electrodes (18), connected to a high voltage power source (6) such that the negative polarity output of the power source (6) is connected to electrodes (18) and the positive ground is connected to tubes (17). Some of the purposes of WESP1 (5) is (1) to generate ozone and form various free radicals such as OH., O., $HO_2$., etc. and (2) provide charging and collection of solid particles and liquid droplets still remaining in the gas. To that end, with specific reference to FIG. 2A and FIG. 2B, the design of the WESP1 unit should conform to the following:

The calculation starts with the requirement for the amount of Ozone needed to be generated based on the chemistry of the gas to be cleaned. This is dependent on gas composition and level of contamination for each project situation. These need to be experimentally determined on a case by case basis. Once the amount of needed ozone is determined, and the amount of oxygen in the intake gas stream for conversion to ozone is determined, the Corona Discharge Current can be calculated in a manner well known in the art using the formula:

$$O_3 = L \times I$$

were $O_3$ is amount of Ozone produced in the gas stream, L is coefficient a dependent on oxygen content of the incoming gas stream, and I is the Corona Discharge Current that will be needed.

Based on the required Corona Discharge Current I, the number of sharp points required can be calculated in a manner well known in the art using the formula $$I = K \times NSHP$$

(where K is a coefficient and $N_{SHP}$ is the total number of sharp points, and I is Corona Discharge Current. Coefficient K is reflecting electrical conditions inside the tubes as well as sharpness of the edge of the needle and is determined experimentally for a particular tube (17) and electrode (18) combination).

Once the number of required sharp points (NSHP) is determined, the gap size X, and the sharp point separation distance between two sharp points Y can be suitable calculated and chosen using the following relationships with due consideration for the overall size and number of tubes (17) having already been selected based on the typical operating velocity of the gas in the WESP1 (5).

The required electric field strength (RFS) within the ozone generator is 25 KV/in.

X is measured and is the gap between the closest tube wall (17) and the closest sharp point (19) of electrode (18) thereto U is the—operating average voltage in KV RFS is the Reguired Field Strength and are related:

$$X = U/RFS$$

thus, when using standard transformers of 40 KV or 70 KV respectively, X should be 1.6 in or less (re 40 KV transformer) or 2.8 in or less re 70 KV transformer. For other gap distances X, non-standard transformers need to be constructed so that the required field strength can be obtained.

Y (in inches)=0.5X (in inches)

is the straight line distance between neighboring sharp points, both in vertical direction along length of the electrode and circumferentially around the electrode (truncated to a whole number by dropping any fractional amount of said sharp points at any horizontal cross section and which are evenly spaced about a circle of diameter D−2X having a circumference ($\pi(D-2X)$)) where a sharp point is.

The inside diameter of the tubes (17), shown as D in the Figures is preferably at least 10 in, tm order to have a fewer number of tubes for a given size of the unit and the size of electrode body (18), but this may be varied as desired to smaller or larger tubes in accordance with the non-exclusive exemplary alternative indicated in the Tables below in this paragraph. Electrode body (18) should be sufficiently mechanically rigid so that it can be kept strictly in the center of large tube (17) and the sharp points (19) can protrude to greater or lesser distances toward the tube wall (17) as needed.

Figure 2A:
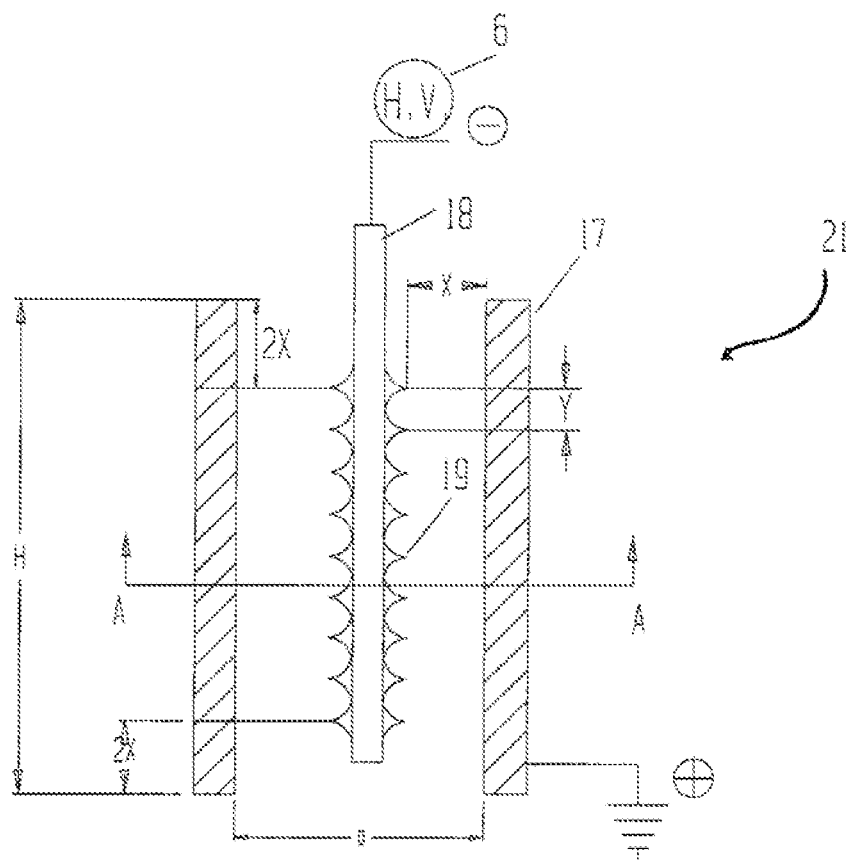
FIG. 2A is a cross-sectional view of the plasma generation chamber shown in FIG. 1.

The overall height (H) of the tubes as shown in FIG. 2A is the SUM of (a) the ((number of sharp points along the length of the electrode as seen in FIG. 2A ($NSP_{length}$) minus 1) times 0.5X)+4X. In other words:

$$H=((NSP_{length}-1)\text{times}0.5X)+4X$$

or restated in terms of the $NSP_{length}$:

$$NSP_{length}=(((H-4X)/(0.5X))+1)$$

Figure 2B:
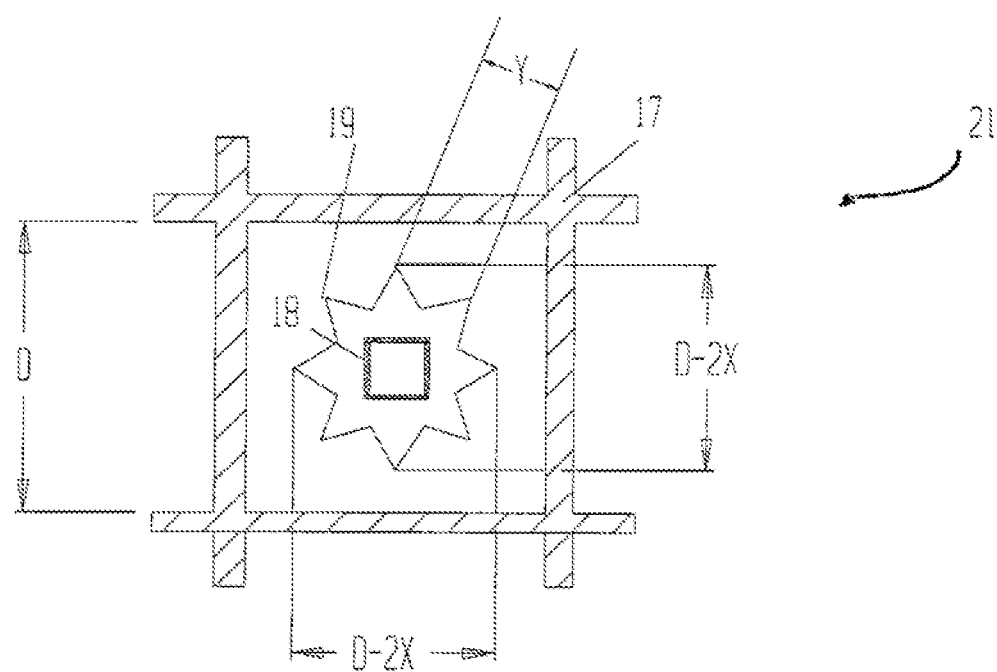
FIG. 2B is a cross-sectional view along line A-A of FIG. 2A.

FIG. 2B is a cross section of FIG. 2A along line A-A. In one particular embodiment, the tubes (17) are constructed from solid 316 L materials and are square in shape. Advantageously, the tubes (17) define an internal open space D (as seen in 'FIG. 2B) of 10 in. by 10 in., and also advantageously are 94 in. long. Other sizes and lengths can be chosen as desired or as needed as long as the gas stream load can be accommodated and sufficient ozone can be produced thr the conversion of low aqueous solubility oxides to higher oxides of greater aqueous solubility. The electrode (18) contained within each tube (17) is also preferably constructed of stainless steel, more preferably 316 L stainless steel tubing. The advantage of stainless steel for both tube (17) and electrode (18) is that stainless steel insures the longevity of both tube (17) and electrode (18) when the oxides contact water and form acids. For example, the following table shows various non-limiting number of sharp points due to choosing the particular tube (17) size and electrode (18) size.

It follows from the foregoing equations and depictions in the FIG. 2A and FIG. 2B, that the amount of Ozone production (lb./hr.) that is required for NO oxidation depends on the following:

Number of tubes
Length of the tubes
Operating voltage
Size of the electrodes

As such, the invention provides a higher efficiency gas stream cleaning, with smaller surface area and smaller size of the equipment compared to art devices and systems regardless of the amount of inlet particulate load during the burner operation, which translates into a better ability to incorporate gas stream cleaning in many smaller operations that were not previously amendable to such cleaning processes and to do such cleaning at a much reduced cost of the equipment and further a much reduced cost of operation.

The WESP1 unit (5) incorporates several layers of flow straightening which are provided by the first pass mist eliminator (4) before the gas enters the ionizing section. Typically the flow straightener comprises perforated plates with about 50% open space for gas stream flow therethrough. The first pass mist eliminator (4) providing the gas flow straightening function can have as few as one or as many plates as desired with three being optimal. This insures uniform distribution of the gas stream as it enters the ionizing section. As contaminated gas passes to the ionization section of WESP1 (5), tubes (17) also act as collection tubes, and the wetted surfaces of the collection tubes provide an ideal surface for solids collection keeping the walls clean as collected solids and droplets run down the tubes. The WESP1 (5) (collection) tube (17) section is especially effective in removal of the Condensable (submicron solid particles such as heavy metals and submicron liquid droplets such as sulfuric acid and other acids). In an analogous

| Assuming Tube with D = 10 in. and 72 in long; and Field is fixed at 25 KV/in. | | | | |
|---|---|---|---|---|
| X | 0.5 in | 1.0 in | 1.5 in. | 2 in |
| U | 12.5 V | 25 KV | 37.5 KV | 50 KV |
| D − 2X | 9 in | 8 in | 7 in | 6 in |
| π(D − 2X) | 28.26 in | 25.12 in | 21.98 in | 18.84 in |
| Y = 0.5X | 0.25 in | 0.5 in | 0.75 in | 1 in |
| [π(D − 2X)]/Y | 113.04 | 50.24 | 28.56 | 18.84 |
| Whole number rounding (A) of prior line = no. of points/star | 113 | 50 | 28 | 18 |
| Total points per tube = A({[72 in − 4X]/0.5X} + 1) | | | | |
| 72 − 4X | 70 in | 68 in | 66 in | 64 in |
| {[72 in − 4X]/0.5X} | 280 | 136 | 88 | 64 |
| ({[72 in − 4X]/0.5X} + 1) | 281 | 137 | 89 | 65 |
| A{[72 in − 4X]/0.5X} + 1) | 31,866 | 6,850 | 2,492 | 1,170 |
| Assuming Tube with D = 8 in. and 72 in long; and Field is fixed at 25 KV/in. | | | | |
| X | 0.5 in | 1.0 in | 1.5 in | 2 in. |
| U | 12.5 V | 25 KV | 37.5 KV | 50 KV |
| D − 2X | 7 in | 6 in | 5 in | 4 in |
| π(D − 2X) | 21.98 in | 18.84 in | 15.7 in | 12.56 in |
| Y = 0.5X | 0.25 in | 0.5 in | 0.75 in | 1 in |
| [π(D − 2X)]/Y | 87.92 | 37.68 | 20.92 | 12.56 |
| Whole number rounding (A) of prior line = no. of points/star | 87 | 37 | 20 | 12 |
| Total points per tube = A({[72 in − 4X]/0.5X} + 1) | | | | |
| 72 − 4X | 70 in | 68 in | 66 in | 64 in |
| {[72 in − 4X]/0.5X} | 280 | 136 | 88 | 64 |
| ({[72 in − 4X]/0.5X} + 1) | 281 | 137 | 89 | 65 |
| A({[72 in − 4X]/0.5X} + 1) | 24,447 | 5,069 | 1,780 | 780 | fashion the WESP2 (7) has similar tubes (not shown), but since these tubes are used with ordinary electrodes for merely giving charge to various particles and droplets, but not for generating an ozone generating corona discharge, they can be of different shape as desired. The WESP2 (7) electrodes also require the "sharp points" (19) that are used for particles charging and collecting as a final cleaning before the discharge. The number of points and field strength are substantially less and calculated based on the power requirements for desired collecting efficiency as usually is done for ordinary previously known Wet Electrostatic Precipitator units. The surfaces of the tubes and electrodes used in the WESP2 (7) unit also provide excellent collection surfaces for charged particles and droplets. The tubes and electrodes of the WESP2 (7) unit are preferably also made of stainless steel.

The free radicals generated by the high voltage field in WESP1 (5) by Corona discharge are very effective for removal of nitrogen oxides ($NO_x$), carbon monoxide (CO) and hydrocarbons (HC), while charged particles of soot are agglomerated and collected on the surfaces of the tubes (17) as discussed above.

Since the conventional direct current corona discharge does not provide the required amount of oxidizing free radicals for $NO_x$ removal, the invention system and ozone generation portion of WESP1 (5) has been constructed as a tubular type vertical WESP unit and is constructed with multiple sharp points (19) (the sharp points are discharging points for the corona discharge) and is also configured so as to maximize ozone production and further to maximize the efficiency of particulate substance removal.

In WESP1 (5) and the oxide scrubber of WESP2 (7), a honeycomb square configuration is utilized for the collection surfaces which maximizes the usage of the space to provide maximum collection surface area and at the same time minimizes the cost of the material.

With respect to each of the Quencher/ARDS (2) unit and WESP1 (5), and WESP2 (7), there are various sprayers (25a) through (25e) for introducing aqueous liquid for either droplet formation or for dissolution of water soluble oxides or simply washing the gas stream of particles.

The low pressure drop (i.e., small difference between intake gas pressure and exhaust gas (after cleaning) stream pressure) through the invention system minimizes the system resistance saving optional blower (14) horsepower that would otherwise be required by other types of control devices, resulting in significantly lower (generally at least 20 times) overall operating costs comparing to conventional scrubbing system.

The optional, but preferable, reuse of the scrubbing liquid in the invention system is accomplished using either a common integral sump or independent ones (3a) and (3b) as desired, but preferably a common one. A continuous bleed is taken from the sump to remove the collected solids from the Rod-Deck side of the tank that have much higher solids concentration of large particles. Fresh water makeup is introduced into the system to compensate the water evaporation rate for cooling. The sump recycle liquid is also used for intermittent washing of the various tubes.

In a preferred embodiment, the proposed configuration allows Quencher/ARDS (2) and to the two WESP units (5) and (7) to operate together and at the same time combine the efficiency of each so as to raise the total efficiency according to the formula:

$$\text{Eff (total)} = 1 - \{(1 - \text{Eff of ARDS (2)}) \times (1 - \text{Eff WESP1 (5)}) \times (1 - \text{Eff WESP2 (7)})\}$$

where the efficiency of each of ARDS (2), WESP1 (5) and WESP2 (7) is presented in decimal fractions. For example, if the ARDS (2) is delivering 50% efficiency for larger particles and WESP1 (5) is delivering 80% efficiency for sub-micron particles under heavy load and current suppression and WESP2 (7) is delivering 90%, the combined efficiency is:

$$\text{Eff (total)} = 1 - [(1-0.5) \times (1-0.8) \times (1-0.9)] = 0.99 \text{ or } 99\%$$

Also, advantageously, in some embodiments of the invention washing of each WESP unit (5) and (7) and the ARDS unit (2) can be done independently from each other without disrupting the overall process, further contributing to cost savings in operation.

After the WESP2 unit there is a mist eliminator (25e) for removal of all droplets by the wash nozzles in order to provide washing of the WESP2 unit walls without process disruption.

While certain novel features of the present invention have been shown and described, it will be understood that various omissions, substitutions and changes in the forms and details of the device illustrated and in its operation can be made by those skilled in the art without departing from the spirit of the invention.

We claim:

1. A system for cleaning exhaust gases of environmentally undesirable oxides and particulate matter comprising
a quencher/adjustable rod-deck scrubber (ARDS) having an intake region for intake of a gas stream in need of cleaning;
an ARDS exit port;
said ARDS exit port connected to a first duct;
said first duct passing over a first liquid, said first liquid having a first liquid surface and said first liquid being present in a first liquid container such that said gas stream when passing through said first duct is capable of contacting said first liquid surface;
said first duct having a first duct exit port, said first duct exit port connected to a first wet electrostatic precipitator (WESP1) having an ozone generator as a part thereof;
said WESP1 having to WESP1 exit port after said ozone generator such that said gas stream flowing through said system, after passing through said first duct into said WESP1 and through said ozone generator passes through said WESP1 exit port and into a second duct connected to said WESP1 exit port;
said second duct passing over a second liquid having a second liquid surface and said second liquid being present in a second liquid container such that any gas stream when passing through said second duct is capable of contacting said second liquid surface;
said second duct havine a second duct exit port connected to a second wet electrostatic precipitator (WESP2);
said WESP2 having a WESP2 exit port connected to a third duct which directs said gas stream
(a) to an overall system exit port,
(b) through a fan and then said overall system exit port,
(c) through a stack, or
(d) through a fan and then through a stack,
for release of cleaned gas to said environment;
said ozone generator capable of operating on impure exhaust gas stream from a fossil fuel burning boiler or furnace comprising
an ozone generation chamber constructed of at least one conducting metallic square tubes, said square tubes having two pairs of opposing walls, and an opening between each pair of said opposing walls of an inside dimension D; at least one wall of each of said square tubes to be connected to a ground (i.e. "a positive terminal") of an electrical power source;

each of said square tubes having an electrode centrally placed between each pair of parallel walls of said tube, said electrode to be connected to a negative lead said electrical power source;

said electrode having a top and a bottom, a length and a multitude of sharp points along the length thereof being located within said square tube such that there is each of a first sharp point as measured from the top or the bottom of the electrode and said first sharp points are not less than a distance 2X from the top and the bottom of the square tube walls with which the first electrode is associated;

where X is a minimum distance which is between the sharp points of the electrode inside the square tube and a wall of the square tube;

said sharp points at any one horizontal cross section of said electrode when in said square tubes when vertically positioned and said electrode therein being of a star-type shape with the number of Sharp Points (NSP) at any one horizontal level ($NSP_{per\ level}$ being defined by $$NSP per\ level = \frac{\pi(D - 2X)}{0.5X}$$

which is truncated to a whole number by dropping any fractional amount of said sharp points at any one horizontal cross section and which are evenly spaced about a circle of diameter D−2X having a circumference ($\pi(D-2X)$) with the total number of sharp points per electrode ($NSP_{per\ electrode}$) being the $NSP_{per\ level}$ times (((the height of the square tube−4X)/0.5X)+1).

2. The system of claim 1, wherein each of the tubes and electrodes is constructed of stainless steel.

3. The system of claim 2 wherein said stainless steel is 316 L stainless steel.

4. A method of improved generation of ozone comprising connecting the generator of claim 1 to said power source, introducing a gas stream into said generator and permitting the generator to generate ozone.

5. The system of claim 1 further comprising a wencher/adjustable rod-deck scrubber (ARDS) positioned such that a gas strew to be cleaned contacts said ARDS prior to being directed into said generator.

6. The system of claim 5 wherein said ARDS is connected via ducts over a liquid surface so that said gas stream to be cleaned after leaving said ARDS contacts said liquid surface prior to being introduced into said generator.

7. The system of claim 1 wherein said ozone generator has an ozone generator outlet and said ozone generator outlet is connected via ducts over a liquid surface to a wet electrostatic precipitator.

8. A method of use of the system of claim 1 for cleaning a gas stream of environmentally unfriendly oxides and particulate matter resulting from a boiler or furnace running on fossil fuels comprising introducing said gas stream into the system of claim 1, cleaning said gas stream with the system of claim 1, releasing the result thereof from the system of claim 1 into the environment.

9. The method of claim 8, wherein each of the tubes and electrodes is constructed of stainless steel.

10. The method of claim 9 wherein said stainless steel is 316 L stainless steel.

11. The method of claim 8 wherein the system further comprising a quencher/adjustable rod-deck scrubber (ARDS) positioned such that a gas stream to be cleaned contacts said ARDS prior to being directed into said generator.

12. The method of claim 11 wherein said ARDS is connected via ducts over a liquid surface so that said gas stream to be cleaned after leaving said ARDS contacts said liquid surface prior to being introduced into said generator.

13. The method of claim 8 wherein said ozone generator has an ozone generator outlet and said ozone generator outlet is connected via ducts over a liquid surface to a wet electrostatic precipitator.

* * * * *